United States Patent [19]
Meisenburg et al.

[11] Patent Number: 5,829,564
[45] Date of Patent: Nov. 3, 1998

[54] MARINE DRIVE SHIFT MECHANISM WITH CHAMFERED SHIFT RINGS, STEPPED CAMS, AND SELF-CENTERING CLUTCH

[75] Inventors: Gary L. Meisenburg; Phillip D. Magee, both of Stillwater, Okla.

[73] Assignee: Brunswick Corporation, Lake Forest, Ill.

[21] Appl. No.: 837,284

[22] Filed: Apr. 11, 1997

[51] Int. Cl.$^6$ .............................. F16H 3/14; F16D 21/04
[52] U.S. Cl. ........................ 192/21; 192/48.91; 192/51; 192/93 R; 74/378; 74/473.37
[58] Field of Search .................. 192/21, 48.91, 192/51, 52.4, 54.5, 66.2, 93 R, 93 A; 74/337.5, 378, 473.36, 473.37; 440/75

[56] References Cited

U.S. PATENT DOCUMENTS

| | | | |
|---|---|---|---|
| 3,269,497 | 8/1966 | Bergstedt | 192/51 |
| 3,923,131 | 12/1975 | La Follette | 192/21 |
| 4,223,773 | 9/1980 | Croisant | 192/48.91 |
| 4,244,454 | 1/1981 | Bankstahl | 192/21 |
| 4,257,506 | 3/1981 | Bankstahl | 192/21 |
| 4,630,719 | 12/1986 | McCormick | 192/21 |
| 4,679,682 | 7/1987 | Gray, Jr. et al. | 192/21 |
| 5,096,034 | 3/1992 | Foster | 192/51 |

*Primary Examiner*—Richard M. Lorence
*Attorney, Agent, or Firm*—Andrus, Sceales, Starke & Sawall

[57] ABSTRACT

A marine drive shift mechanism includes a shift ring (200) having a chamfer zone (204) along an arcuate portion of its outer circumference facilitating ease of shifting. A stepped camming surface (222) provides step function shifting movement. Neutral positioning notches (238, 240) are provided on the clutch sleeve (18) to improve clutch sleeve (18) placement when the shift mechanism is in neutral.

16 Claims, 5 Drawing Sheets

MARINE DRIVE SHIFT MECHANISM WITH CHAMFERED SHIFT RINGS, STEPPED CAMS, AND SELF-CENTERING CLUTCH

BACKGROUND AND SUMMARY OF THE INVENTION

The invention relates to a marine drive gear shifting mechanism. The invention is particularly useful in the marine drive shift mechanism shown in U.S. Pat. Nos. 4,630,719 and 4,679,682, incorporated herein by reference. In this type of drive, an axially movable central clutch sleeve element is supported for rotation with a main shaft and positioned between forward and reverse gears each having a clutch face, for which further reference may be had to U.S. Pat. No. 4,244,454 and 4,257,506, incorporated herein by reference.

The present invention provides further improvements facilitating ease of shifting and firm, crisp gear engagement.

DETAILED DESCRIPTION OF THE DRAWINGS

Figure 1:
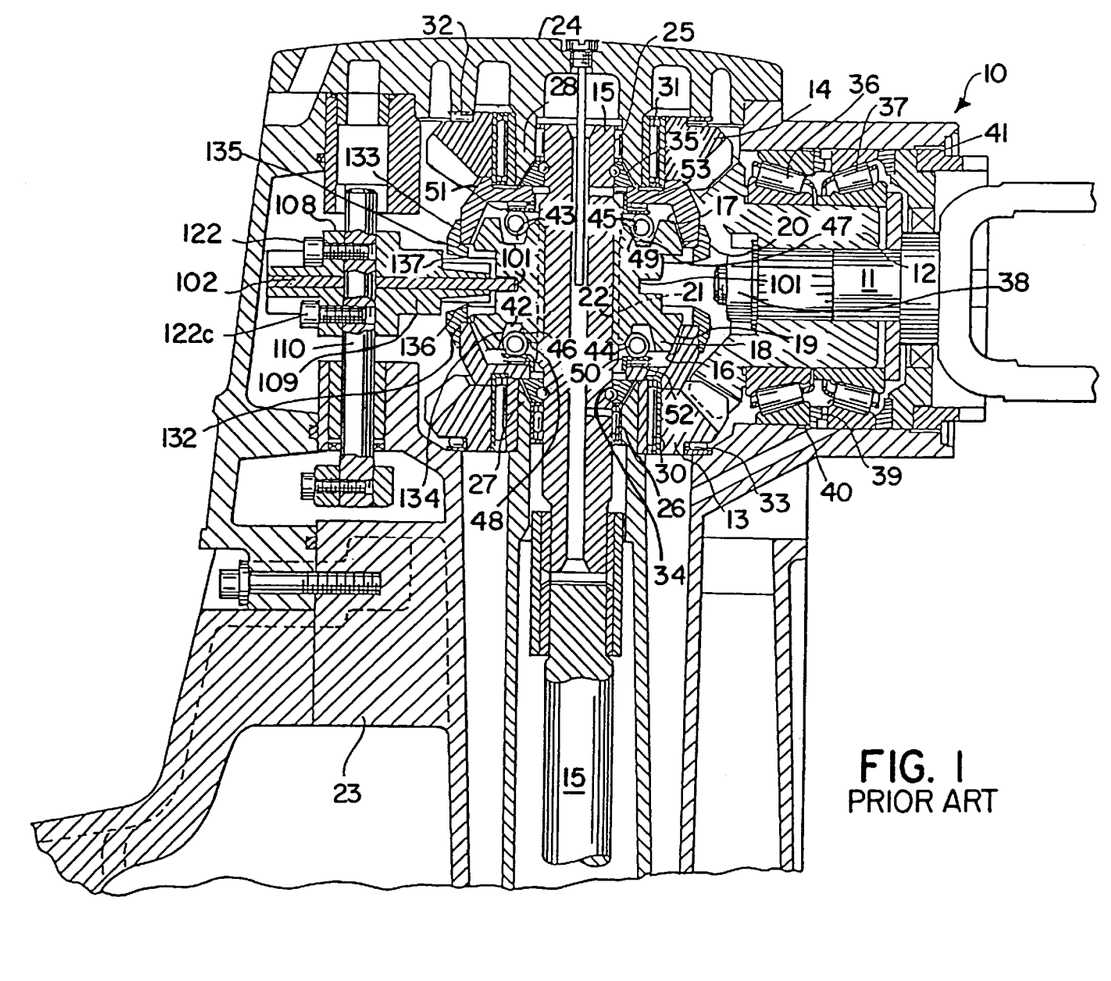
FIG. 1 is a side view in section of the upper portion of a marine stern drive showing the shifting mechanism.

FIGS. 1–5 are taken from FIGS. 1–5 of incorporated U.S. Pat. No. 4,630,719. FIG. 1 shows the upper portion of a marine stern drive unit 10, for which further reference may be had to the above noted incorporated U.S. Pat. Nos. 4,244,454 and 4,257,506. The structure in FIG. 1 which is common with these references will be only briefly described, and like reference numerals are used where appropriate to facilitate clarity. As is well known in such arrangements, an input shaft 11 carries an input bevel gear 12 which drives the counter rotating forward bevel gear 13 and reverse bevel gear 14 which rotate about axial main shaft 15. The forward and reverse gears 13 and 14 (for counter-rotation, gear 13 becomes the reverse gear and gear 14 becomes the forward gear) each have an internal conical clutch surface 16, 17, attached by welding, facing each other. The main shaft 15 carries a clutch sleeve 18 between the clutch gears 13 and 14, the clutch sleeve 18 having conical clutch faces 19 and 20 on each end for mating with the forward and reverse gears. The clutch sleeve 18 has internal helical splines 21 engaged with helical splines 22 on main shaft 15. When clutch sleeve 18 is engaged with either the forward or reverse gear 13 or 14, the helical splines 21 and 22 act to force the engaged clutch faces toward each other, thereby driving main shaft 15 in either forward or reverse. The main shaft 15 extends downwardly to drive a propeller shaft, not shown.

Top cover 24 is attached to gear housing 23 by machine screws, not shown. Main shaft 15 is supported for rotation by the upper and lower main needle bearings 25 and 26 which are mounted on the inside of annular projections 27 and 28 extending from the top cover 24 and the lower housing, respectively. Mounted on the outside of the annular projections 27 and 28, in substantially the same plane as the main bearings and the gear teeth, are the forward and reverse gear needle bearings 30 and 31 which carry the forward and reverse clutch gears 13 and 14. Thrust bearings 32 and 33 are mounted on the housing to position the forward and reverse gears 13 and 14 and support the axial loads thereon. Thrust collars 34 and 35, fixed to main shaft 15, bear against outside surfaces of the forward and reverse gears 13 and 14. Input gear 12 is supported by bearings 36 and 37 which are axially loaded by nut 38 which attaches input shaft 11 to input gear 12. Between the bearings 36 and 37 is a collar 39 which serves to axially position the assembly against a surface 40 machined on gear housing 23. Threaded collar 41 forces collar 39 against the housing 23. Because the housing surfaces on which the bearings rest can be accurately machined, precise location of the forward and reverse gears 13 and 14 relative to the input bevel gear 12 is assured. This arrangement substantially eliminates forces that would tend to misalign the clutch faces, accurately positions the gears, thereby extending the useful life of the unit, and simplifies assembly of the drive unit components.

To provide a smooth, uniform shifting action, the clutch sleeve 18 has grooves 42 and 43 on each end with coil springs 44 and 45, acting as garter springs, placed in tension within each groove 42 and 43. Each groove 42 and 43 has two cam surfaces on which the coil springs are supported. The axially inward cam surfaces 46 and 47 are sloped at 20 degrees to the axis of the main shaft, while the axially outward cam surfaces 48 and 49 are sloped at forty-five degrees. As a result, the coil springs 44 and 45 are always biased axially outward from the end grooves 42 and 43 to push against thrust plates 50 and 51 which in turn ride on bearings 52 and 53 which bear against forward and reverse gears 13 and 14. In this prior system, the intersections of the forty-five degree and 20 degree cam faces are placed to locate the coil springs 44 and 45 very nearly on the intersections when the clutch sleeve 18 is in the neutral position, half way between the forward and reverse gears 13 and 14.

When the clutch sleeve 18 is moved away from its neutral position, say toward the forward gear 13, one spring 45 will ride down onto its forty-five degree cam face 49 while the other spring 44 will ride up onto its twenty degree cam face 46. As a result, the axial force produced by the one spring 45 will increase and the other will decrease, producing a net force to push the clutch sleeve 18 into engagement with the forward gear 13. The spring 44 riding on the twenty degree cam face 46 will act to provide a minimum axial load on the forward gear's thrust plate 50 while the spring 45 will provide an axial load to hold gear 14 in place. Thus a smooth, uniform shifting action will result, since substantially the same force will be applied to the clutch sleeve 18 every time it is shifted. Shifting to reverse is of course the converse of shifting to forward.

The structure described thus far is identical to that shown in the above noted Bankstahl U.S. Pat. Nos. 4,244,454 and 4,257,506.

Figures 2, 3, 4, 5:
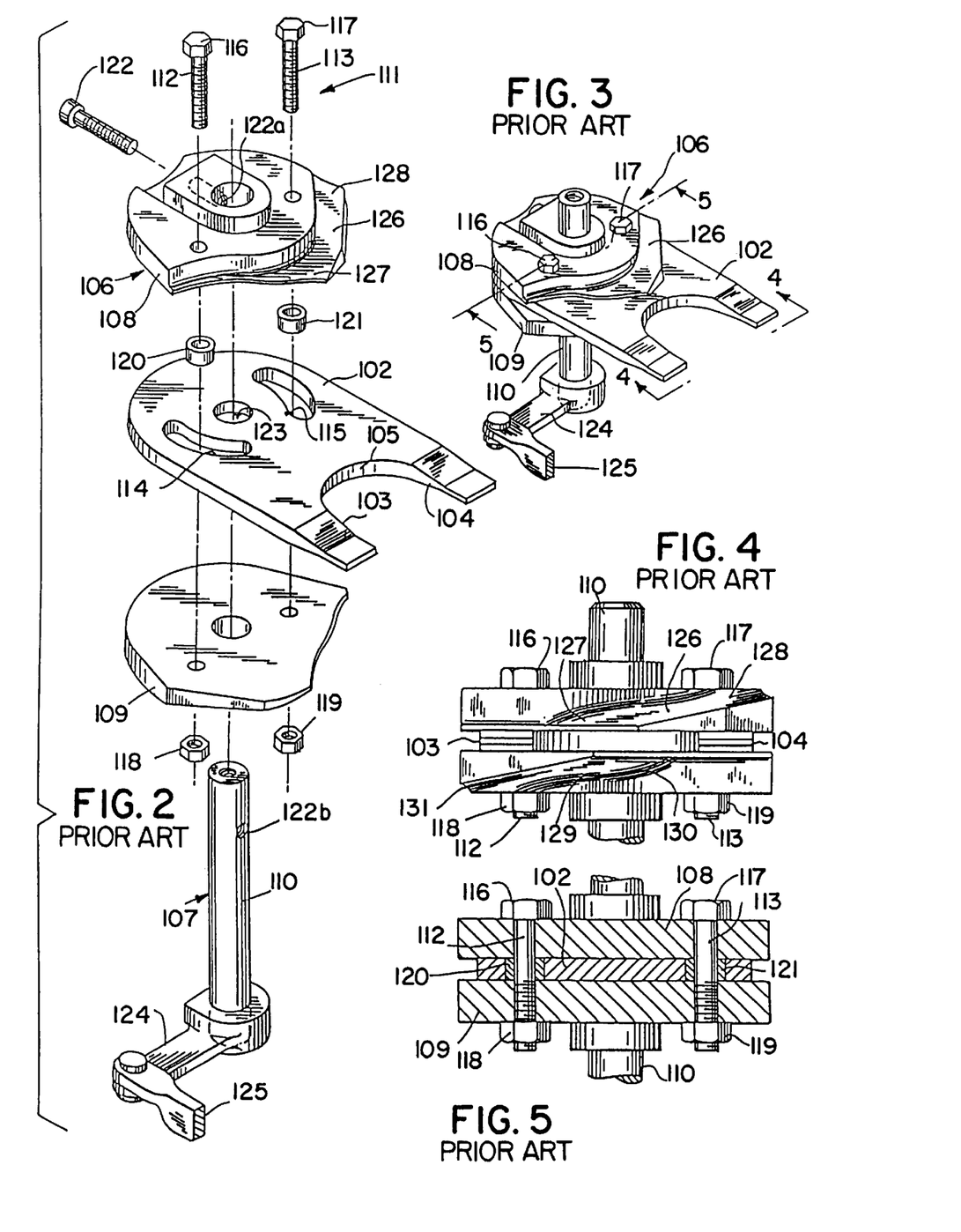
FIG. 2 is an exploded isometric view of a portion of FIG. 1.
FIG. 3 is an assembled isometric view of the structure in FIG. 2.
FIG. 4 is an end elevation view taken along line 4—4 of FIG. 3.
FIG. 5 is a sectional view taken along line 5—5 of FIG. 3.

Referring to FIGS. 1–3, clutch sleeve 18 has an exterior circumferential groove 101 axially between its conical clutch faces 19 and 20. A yoke 102 engages groove 101 for moving clutch sleeve member 18 axially along shaft 15. Yoke 102, FIGS. 2 and 3, is a split fork with tines 103 and 104 and central portion 105 engaging groove 101. Cam means 106 is operatively associated with yoke 102, and actuating means 107 is provided for actuating cam means 106 into engagement with one of the forward or reverse gears 13 and 14 to actuate yoke 102 and drive sleeve member 18 into engagement with the other of the forward and reverse gears.

Cam means 106 comprises first and second cams 108 and 109 on opposite sides of yoke 102. First cam 108 faces reverse gear 14 thereabove. Second cam 109 faces forward gear 13 therebelow. Actuating means 107 comprises an axial shaft 110 parallel to main shaft 15 for rotating cams 108 and 109 relative to yoke 102 about an axis parallel to main shaft 15. Interconnection means 111 is provided for interconnecting cams 108 and 109 to each other to rotate in unison relative to yoke 102.

Interconnection means 111 includes attachment means such as axial bolts 112 and 113 extending through apertures 114 and 115 in yoke 102 and connected to each of cams 108 and 109, such as at enlarged heads 116 and 117 and nuts 118 and 119. Annular spacer sleeves 120 and 121 are provided around bolts 112 and 113 and extend through respective apertures 114 and 115 in yoke 102 and engage cams 108 and 109 at the axial ends of sleeves 120 and 121. Spacer sleeves 120 and 121 have a height or thickness slightly greater than the thickness of yoke 102 in order to space first and second cams 108 and 109 apart by a distance slightly greater than the thickness of yoke 102, which allows the first and second cams to rotate in unison relative to yoke 102 with minimal frictional retardation. Cam 108 is mounted to actuating rotary shaft 110 by set screw 122 extending through aperture 122a in cam 108 and received in threaded aperture 122b in shaft 110. A set screw may be provided for either or both of cams 108 and 109, for example as shown in FIG. 1 at 122 and 122c, though only a single set screw is needed because the cams are locked together by bolts 112 and 113 and rotate in unison.

Apertures 114 and 115 have an arcuate configuration defining an arc about a center at rotary shaft 110 through aperture 123 of the yoke. First and second cams 108 and 109 may thus rotate about the axis of shaft 110, without rotation of yoke 102 which remains in groove 101 of sleeve member 18. Rotary axial shaft 110 is operated through a lever arm 124 and linkage 125, and has a central neutral position and forward and reverse rotated positions on opposite sides of the neutral position. In the orientation in FIG. 2, clockwise rotation of shaft 110 provides the forward position, and counter-clockwise rotation of shaft 110 provides the reverse position.

Cam 108 has an arcuate tapered camming surface 126 having a reduced height portion 127 axially aligned with and spaced from reverse gear 14 thereabove when actuating means 107 is in the neutral position, and having an increased height portion 128 axially aligned with and engaging the reverse gear thereabove when actuating means 107 is rotated to the forward position, such that engagement of camming surface 126 of cam 108 with the reverse gear drives yoke 102 axially downwardly away from the reverse gear 14 and toward forward gear 13 to drive clutch sleeve 18 into engagement with the forward gear at conical clutch faces 19 and 16. Second cam 109 has a tapered arcuate camming surface 129, FIG. 4, having a reduced height portion 130 axially aligned with and spaced from the forward gear 13 therebelow when actuating means 107 is in the neutral position, and having an increased height portion 131 axially aligned with and engaging forward gear 13 when actuating means 107 is rotated to the reverse position, such that engagement of camming surface 129 of cam 109 with the forward gear drives yoke 102 axially upwardly away from the forward gear and toward the reverse gear 14 to drive sleeve member 18 into engagement with reverse gear 14 at conical clutch faces 20 and 17. Camming surfaces 126 and 129 of first and second cams 108 and 109 are oppositely tapered, with axially aligned reduced height portions 127 and 130, and offset increased height portions 128 and 131. Engagement of the respective tapered camming surfaces with the respective gear drives clutch sleeve 18 out of engagement with that gear such that torque applied to the cams 108 or 109 through the forward or reverse gear assists clutch disengagement of that gear such that requisite shift force decreases as torque increases.

In the preferred embodiment, the forward and reverse gears 13 and 14 include respective first and second annular rings 132 and 133 around facing circumferential edges 134 and 135 of the forward and reverse gears. In one form, brass rings 132 and 133 are pressfit onto the facing peripheral edges of the noted gears. The rings lie in a circumferential plane about main axial shaft 15. Each ring has an eccentric face surface 136 and 137 lying in the noted circumferential plane. Shift means, as above described, is provided by yoke 102, cams 108 and 109 and actuating means 107. Camming surface 126 of cam 108 is rotated into engagement with eccentric face surface 137 of ring 133 to actuate yoke 102 and drive clutch sleeve 18 axially downwardly out of engagement with reverse gear 14 and into engagement with forward gear 13 with a pulsed impact hammer effect due to the eccentricity of face surface 137 of ring 133 as it rotates in the noted circumferential plane about main shaft 15. The pulsed hammer effect disengagement of clutch sleeve 18 from reverse gear 14 further facilitates ease of shifting disengagement, in addition to the noted torque aided disengagement, such that the requisite disengagement shift force further decreases as engine speed and torque increases. In the other direction, camming surface 129 of cam 109 is rotated into engagement with eccentric face surface 136 of ring 132 to actuate yoke 102 and drive clutch sleeve 18 axially upwardly out of engagement with forward gear 13 and into engagement with reverse gear 14 with a pulsed impact hammer effect due to the eccentricity of face surface 136 of ring 132 as it rotates in the noted circumferential plane about main shaft 15. The pulsed hammer effect disengagement of clutch sleeve 18 from forward gear 13 further facilitates ease of shifting disengagement, in addition to the noted torque aided disengagement, such that the requisite disengagement shift force further decreases as engine speed and torque increases. Each of the eccentric face surfaces 136 and 137 is preferably machined to have a maximum height portion 180° offset from a minimum height portion to provide one impact on the respective cam per revolution of the respective gear means.

The structure described thus far is identical to that shown in the above noted U.S. Pat. No. 4,630,719.

Referring to FIGS. 6–12, there is shown a shift ring 200 which replaces shift ring 132 and is threaded or pressfit onto the facing peripheral edge of forward gear 13. Another shift ring identical to ring 200 replaces shift ring 133 and is threaded or pressfit onto the facing peripheral edge of reverse gear 14. Each respective replacement shift ring 200 lies in a respective circumferential plane about main axial shaft 15 and each has a face surface 202 generally in the respective plane. Face surface 202 of the ring is eccentric, as above, and has a high point at 206, FIG. 12, and a low point at 208, FIG. 11, 180° from and distally opposite high point 206. The face surface 202 has a chamfer zone 204 along an arcuate portion of its outer circumference. The chamfer zone is formed by a chamfered surface extending diagonally relative to the noted circumferential plane. The chamfer zone 204 is preferably centered across the low point 208 of the eccentric ring face surface 202. The camming surface of the respective cam 108 or 109 is rotated into engagement with eccentric face surface 202 to actuate yoke 102 and drive clutch sleeve 18 axially out of engagement with one of the gears and into engagement with the other gear with a pulsed impact hammer effect due to the eccentricity of eccentric face surface 202 as it rotates in the noted circumferential plane about main shaft 15.

Figure 6:
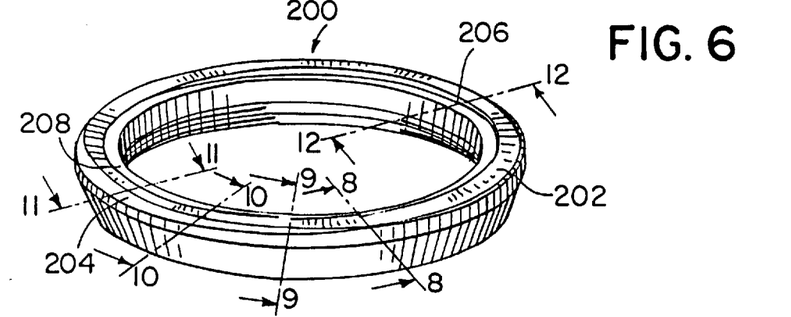
FIG. 6 is an isometric view of a shift ring constructed in accordance with the invention.

When cam 108 is turned into engagement with the eccentric face surface 202 of the ring 200, cam surface 126 moves into chamfer zone 204 of the eccentric face surface 202. As the ring 200 rotates with reverse gear 14, movement of cam 108 into engagement with eccentric face surface 202 is facilitated, and yoke 102 is actuated to drive clutch sleeve 18 out of engagement with reverse gear 14 and into engagement with forward gear 13. Likewise, when cam 109 is turned into engagement with the face surface 202 of the ring replacing ring 132, cam surface 129 moves into chamfer zone 204. As the ring rotates with forward gear 13, movement of cam 109 into engagement with face surface 202 is facilitated, and yoke 102 is actuated to drive clutch sleeve 18 out of engagement with forward gear 13 and into engagement with reverse gear 14.

Chamfer zone 204 moves in a circle in a circumferential plane about main shaft 15. Cam 108 moves in the noted circumferential plane and along an arc intersecting the noted circle, such that as ring 200 rotates in the noted circumferential plane, chamfer zone 204 moves around the circle, and during a portion of such circle is in alignment with cam 108 when the noted circle is intersected by the noted arc, to facilitate engagement of cam 108 and face surface 202 of the ring as cam 108 moves into chamfer zone 204. The operation for the ring 200 replacing ring 132 is comparable.

As shown in FIGS. 7–12, eccentric face 202 of ring 200 includes an annular camming surface 210 and an outer transition surface 212 which is included in the chamfer zone 204. The chamfered surface along outer annular transition surface 212 has a radial width across the annulus thereof, which radial width varies along the arc. The chamfered surface has a central section 214 of maximum radial width, and end portions 216, 218 of minimum radial width and spaced on opposite arcuate sides of central portion 214. The chamfered surface begins at portion 216 at minimum radial width and tapers to maximum radial width at central portion 214 and then tapers to minimum radial width at portion 218.

Figure 7:
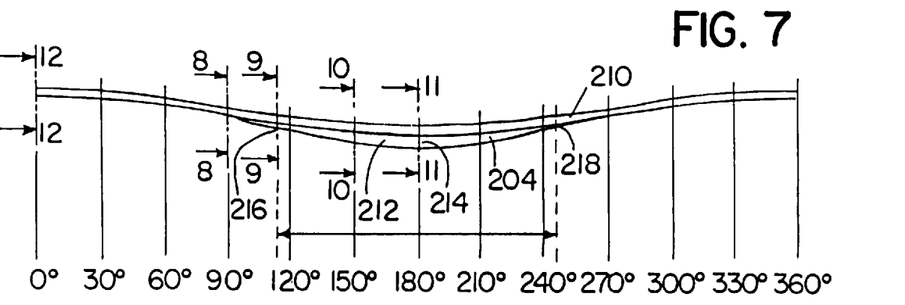
FIG. 7 shows the profile of the annular facing surface of the ring of FIG. 6 unrolled and laid out on a linear scale from 0° to 360°.
Figures 8, 9, 10, 11, 12:
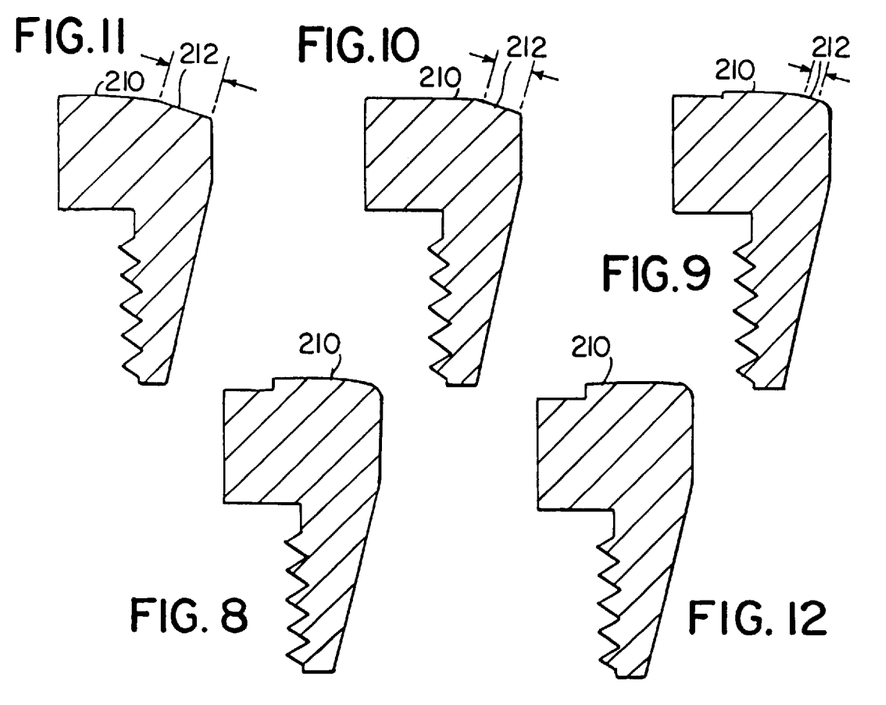
FIG. 8 is a cross sectional view taken along line 8—8 of FIG. 7.
FIG. 9 is a cross sectional view taken along line 9—9 of FIG. 7.
FIG. 10 is a cross sectional view taken along line 10—10 of FIG. 7.
FIG. 11 is a cross sectional view taken along line 11—11 of FIG. 7.
FIG. 12 is a cross sectional view taken along line 12—12 of FIG. 7.

As noted above, each of the rings 200 replacing respective rings 132 and 133 is eccentric such that clutch sleeve 18 is driven into engagement with the respective gear with the noted pulsed impact hammer effect. Each of the eccentric camming surfaces of the rings has a maximum height portion at 206, 180° offset from minimum height portion 208, to provide one impact on the respective cam 108, 109 per revolution of the respective gear 14, 13. The chamfered surface of outer transition surface 212 of the ring has a central portion radially aligned with minimum height portion 208 of the camming surface. The radial width of the chamfered surface varies along the noted arc, and the maximum radial width 214 of the chamfered surface is at the minimum height portion 208 of the chamfered surface.

FIGS. 13 through 16 show further cam structure. Cam 220 replaces cam 108 and has a stepped camming surface 222 with different height portions separated by step transitions. Cam 220 is rotatable relative to yoke 102 about the axis along shaft 110 parallel to main shaft 15. Cam 220 can rotate into engagement with the face surface 202 of the ring 200 replacing ring 133 as the ring rotates with reverse gear 14, to actuate yoke 102 with step function movement as the step transition engages face surface 202 of the ring 200, to drive clutch sleeve 18 out of engagement with reverse gear 14 and into engagement with forward gear 13. Cam 224 is identical to cam 220 and replaces cam 109, and like cam 220 has a stepped camming surface with different height portions separated by step transitions and rotatable relative to yoke 102 about the axis through shaft 110 parallel to main shaft 15 and into engagement with the face surface 202 of the ring 200 replacing ring 132 as the ring rotates with forward gear 13, to actuate yoke 102 with step function movement as the step transition engages face surface 202 of the ring, to drive clutch sleeve 18 out of engagement with forward gear 13 and into engagement with reverse gear 14.

Figures 13, 14, 15, 16:
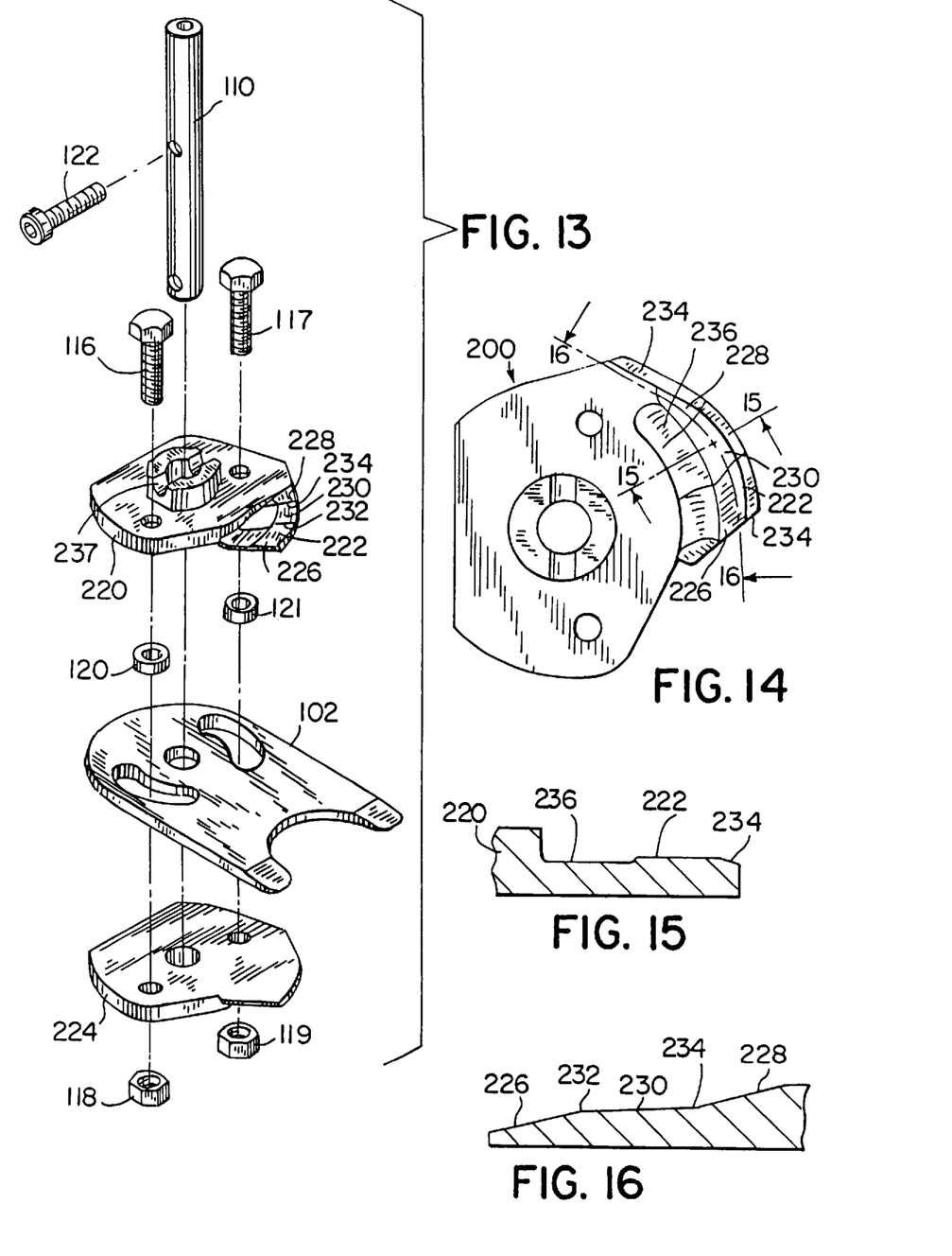
FIG. 13 is similar to FIG. 2 and shows an alternate cam and mounting arrangement.
FIG. 14 is a top view of the cam shown in FIG. 13.
FIG. 15 is a cross sectional view taken along line 15—15 in FIG. 14.
FIG. 16 shows the camming profile of the cam of FIG. 14 as taken along line 16—16 in FIG. 14.

FIG. 16 shows the camming profile of camming surface 222. The cam has first and second inclined camming surfaces 226 and 228 separated by a land 230 and two steps 232 and 234 to provide double step transition movement of clutch sleeve 18. It is preferred that step 232 be a smooth transition between inclined camming surface 226 and land 230, and that step 234 be a smooth transition between inclined camming surface 228 and land 230. Inclined camming surface 226 of cam 220 acts as an outgear ramp and engages face surface 202 of the ring 200 to drive clutch sleeve 18 out of engagement with reverse gear 14. Step 232 engages face surface 202 of the ring 200 to further drive clutch sleeve 18 out of engagement with reverse gear 14 in step transition movement. Land 230 faces face surface 202 of the ring as the shifter moves through a neutral position between reverse and forward drive positions. Step 234 engages face surface 202 of the ring to drive clutch sleeve 18 into engagement with forward gear 13 in step transition movement. Inclined surface 228 acts as an ingear ramp and engages face surface 202 of the ring to further drive clutch sleeve 18 into engagement with forward gear 13. Likewise, the first inclined surface of the second cam 224 engages the face surface 202 of the ring replacing ring 132 to drive clutch sleeve 18 out of engagement with forward gear 13, and the first of the steps of cam 224 engages face surface 202 of the ring to further drive clutch sleeve 18 out of engagement with forward gear 13 in step transition movement, and the land of cam 224 faces the face surface 202 of the ring as the shifter moves through a neutral position between the forward and reverse drive positions, and the second of the steps of cam 224 engages face surface 202 of the ring to drive sleeve member 18 into engagement with reverse gear 14 in step transition movement, and the second inclined surface of cam 224 engages the face surface 202 of the ring to further drive clutch sleeve 18 into engagement with reverse gear 14.

Referring to FIGS. 14 and 15, the cam 220 has a chamfered leading edge 234. The chamfered leading edge 234 allows the cam 220 to more easily engage face surface 202 of the ring 200 as the cam 220 moves into the chamfer zone 204 of the ring 200. The chamfered leading edge 234 on the cam 220 not only eases engagement of cam 220 to facilitate smooth shifting, but also improves system endurance. The cam 220 also has a recessed area 236 located radially inward from the stepped camming surface 222. The area 236 is recessed to reduce the variability of the amount of friction drag between the cam surface 222 and the face 202 of ring 200.

FIG. 13 further shows an alternate cam mounting arrangement. Cam 220 has an open slot 237 for receiving screw 122 mounting the cam to shaft 110. Open slot 237 is more easily manufacturable than aperture 122a.

Figure 17:
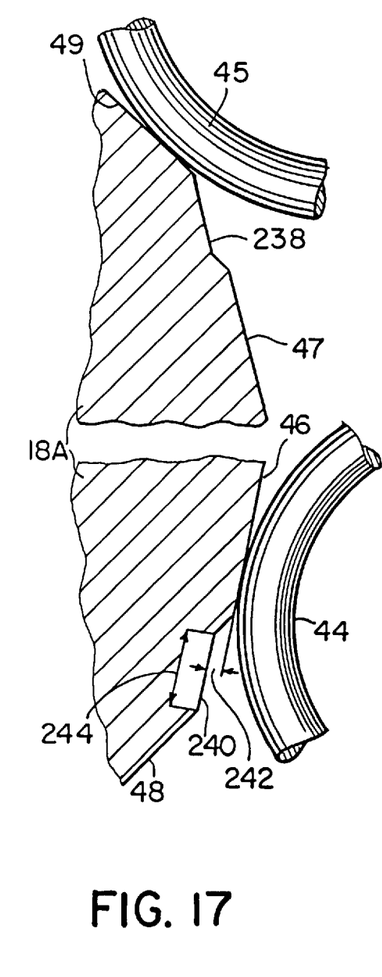
FIGS. 17 and 18 are schematic views illustrating a neutral centering notch in accordance with the invention.
Figure 18:
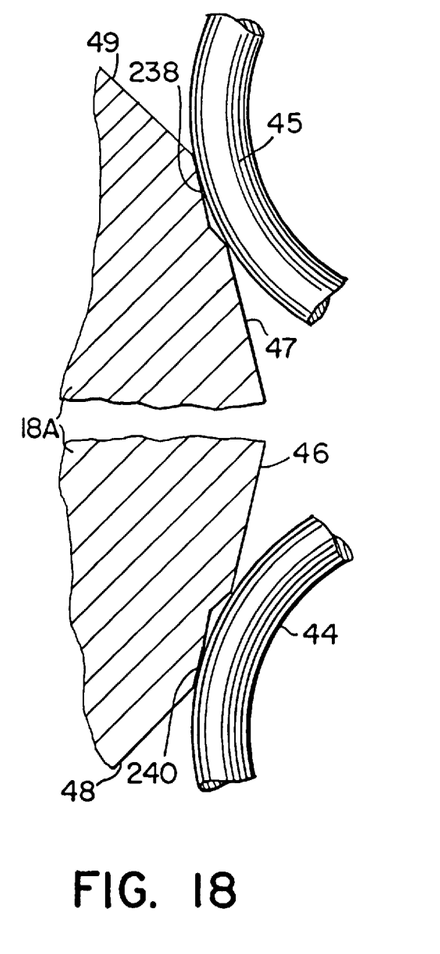

FIGS. 17 and 18 schematically illustrate the operation of neutral centering notches 238 and 240 that can be used in conjunction with clutch sleeve 18A. As described with respect to FIG. 1, coil springs 44 and 45 are placed in tension around the clutch sleeve 18A to promote smooth, uniform shifting action. FIG. 17 shows coil spring 45 riding on the 45° cam face 49 while the other spring 44 rides on the 10° cam face 46. In this position, the axial force produced by spring 45 will be greater than the axial force produced by spring 44 in the opposite direction, thus producing a net axial force to push and maintain the clutch sleeve 18A into engagement with the forward gear 13. Shifting to reverse gear 14 is, of course, the converse of shifting to the forward gear 13. To shift into and maintain in the reverse gear 14, spring 44 will ride down on the 45° cam face 48 while the spring 45 rides up on the 10° cam face 47.

A neutral centering notch 238 for spring 45 is provided at the intersection between the 45° cam surface 49 and the 010° cam surface 47. A neutral centering notch 240 for the spring 44 is provided at the intersection between the 45° cam surface 48 and the 10° cam surface 46. The notches 238 and 240 preferably have a depth 242 of .005/.010 inches and a length 244 of .030/.040 inches. FIG. 18 shows coil 45 engaged in neutral centering notch 238 and coil 44 engaged in neutral centering notch 240. In this position, the axial force from spring 45 is substantially equal to the axial force from spring 44. The tension provided by spring 45 in notch 238 and spring 44 in notch 240 help maintain the clutch sleeve 18A in the neutral position, and help keep the clutch sleeve 18A out of engagement and free from rubbing when in neutral.

It is recognized that various equivalents, alternatives and modifications are possible within the scope of the appended claims.

We claim:

1. A marine drive shift mechanism comprising:
    a main axial shaft;
    a reverse gear freely rotatable about said main shaft, said reverse gear having a clutch face on one side;
    a forward gear freely rotatable about said main shaft, said forward gear having a clutch face on one side, with said clutch faces facing each other;
    a drive gear meshed with said reverse and forward gears for driving said reverse and forward gears in respectively opposite directions of rotation;
    a clutch sleeve mounted on said main shaft between said reverse and forward gears, said clutch sleeve having a clutch face at each end, each clutch face selectively engageable with one of said clutch faces of said reverse and forward gears;
    first and second annular rings around facing circumferential edges of respective said reverse and forward gears, each said ring lying in a respective circumferential plane about said main axial shaft and each having a face surface in its respective said plane, each face surface having a chamfer zone along a portion of its outer circumference, said chamfer zone formed by a chamfered surface extending diagonally relative to said circumferential plane;
    a shifter for selectively moving said clutch sleeve axially along said main shaft to a reverse or forward drive position to engage one of said sleeve clutch faces with one of said reverse or forward gear clutch faces, comprising
        a yoke engaging said clutch sleeve,
        a first cam operatively associated with said yoke and actuatable into engagement with said face surface of said first ring, including into said chamfer zone as said first ring rotates with said reverse gear, to facilitate movement of said first cam into engagement with said face surface of said first ring to actuate said yoke and drive said clutch sleeve out of engagement with said reverse gear and into engagement with said forward gear,
        a second cam operatively associated with said yoke and actuatable into engagement with said face surface of said second ring, including into said chamfer zone as said second ring rotates with said forward gear, to facilitate movement of said second cam into engagement with said face surface of said second ring to actuate said yoke and drive said clutch sleeve out of engagement with said forward gear and into engagement with said reverse gear.

2. The invention according to claim 1 wherein:
    said chamfer zone of said first ring moves in a first circle in a first circumferential plane about said main shaft;
    said first cam moves in said first circumferential plane and along a first arc intersecting said first circle, such that as said first ring rotates in said first circumferential plane, said chamfer zone of said first ring moves around said first circle and during a portion of said first circle is in alignment with said first cam when said first circle is intersected by said first arc, to facilitate engagement of said first cam and said face surface of said first ring as said first cam moves into said chamfer zone of said first ring;
    said chamfer zone of said second ring moves in a second circle in a second circumferential plane about said main shaft;
    said second cam moves in said second circumferential plane and along a second arc intersecting said second circle, such that as said second ring rotates in said second circumferential plane, said chamfer zone of said second ring moves around said second circle and during a portion of said second circle is in alignment with said second cam when said second circle is intersected by said second arc, to facilitate engagement of said second cam and said face surface of said second ring as said second cam moves into said chamfer zone of said second ring.

3. The invention according to claim 2 wherein said face surface of each of said rings includes an annular camming surface and an outer transition surface, and wherein said outer transition surface is chamfered along a given arc of its circumference to provide said chamfered surface providing said chamfer zone.

4. The invention according to claim 3 wherein said chamfered surface along said outer transition surface has a radial width across thereof which varies along the arc of the transition surface.

5. The invention according to claim 4 wherein said chamfered surface has a central section along said arc of maximum radial width, and end portions of minimum radial width are spaced on opposite arcuate sides of said central portion, such that said chamfered surface begins at one of said end portions at minimum radial width and tapers to maximum radial width at said central portion and then tapers to minimum radial width at said other end portion.

6. The invention according to claim 3 wherein:
said annular camming surface of said first ring is eccentric such that said clutch sleeve is driven into engagement with said forward gear with a pulsed impact hammer effect due to said eccentricity of said annular camming surface of said first ring as the first ring rotates about said main shaft; and
said annular camming surface of said second ring is eccentric such that said clutch sleeve is driven into engagement with said reverse gear with a pulsed impact hammer effect due to said eccentricity of said camming surface of said second ring as the second ring rotates about said main shaft.

7. The invention according to claim 6 wherein each of said eccentric camming surfaces of said rings has a maximum height portion 180° offset from a minimum height portion to provide one impact on the respective said cam per revolution of the respective said gear.

8. The invention according to claim 7 wherein said chamfered surface of each said outer transition surface of each said ring has a maximum height portion radially aligned with said minimum height portion of the respective said camming surface.

9. The invention according to claim 8 wherein the radial width of said chamfered surface varies along said arc, and wherein the maximum radial width of said chamfered surface is at said minimum height portion of said chamfered surface.

10. A marine drive shift mechanism comprising:
a main axial shaft;
a reverse gear freely rotatable about said main shaft, said reverse gear having a clutch face on one side;
a forward gear freely rotatable about said main shaft, said forward gear having a clutch face on one side, with said clutch faces facing each other;
a drive gear meshed with said reverse and forward gears for driving said reverse and forward gears in respectively opposite directions of rotation;
a clutch sleeve mounted on said main shaft between said reverse and forward gears, said clutch sleeve having a clutch face at each end, each clutch face selectively engageable with one of said clutch faces of said reverse and forward gears;
first and second annular rings around facing circumferential edges of respective said reverse and forward gears, each said ring lying in a respective circumferential plane about said main axial shaft and each having a face surface in its respective said plane;
a shifter for selectively moving said clutch sleeve axially along said main shaft to a reverse or forward drive position to engage one of said sleeve clutch faces with one of said reverse or forward gear clutch faces, comprising
a yoke engaging said clutch sleeve,
a first cam having a stepped camming surface with different height portions separated by a step transition and rotatable relative to said yoke about an axis parallel to said main shaft into engagement with said face surface of said first ring as said first ring rotates with said reverse gear, to actuate said yoke with step function movement as said step transition engages said face surface of said first ring, to drive said clutch sleeve out of engagement with said reverse gear and into engagement with said forward gear,
a second cam having a stepped camming surface with different height portions separated by a step transition and rotatable relative to said yoke about an axis parallel to said main shaft into engagement with said face surface of said second ring as said second ring rotates with said forward gear, to actuate said yoke with step function movement as said step transition engages said face surface of said second ring, to drive said clutch sleeve out of engagement with said forward gear and into engagement with said reverse gear.

11. The invention according to claim 10 wherein:
said face surface of said first ring has an annular camming surface, and an outer transition surface, and wherein said outer transition surface is chamfered along a given arc of its circumference to provide a chamfer zone facilitating movement of said first cam into engagement with said annular camming surface of said first ring including along said step transition;
said face surface of said second ring includes an annular camming surface, and an outer transition surface, and wherein said outer annular transition surface of said second ring is chamfered along a given arc of its circumference to provide a chamfer zone facilitating engagement of said second cam with said camming surface of said second ring including along said step transition.

12. The invention according to claim 10 wherein each cam has first and second inclined camming surfaces separated by a land and two steps to provide double step transition movement of said clutch sleeve.

13. The invention according to claim 10 wherein each cam has a recessed area located radially inward from the camming surface and the land, and the face surface of the respective ring does not contact the recessed area.

14. The invention according to claim 10 wherein each cam has a chamfered leading edge located at the periphery of the camming surfaces and the land.

15. The invention according to claim 12 wherein:
said first inclined surface of said first cam engages said face surface of said first ring to drive said clutch sleeve out of engagement with said reverse gear, the first of said steps of said first cam engages said face surface of said first ring to further drive said clutch sleeve out of engagement with said reverse gear in step transition movement, said land of said first cam faces said face surface of said ring as said shifter moves through a neutral position between said reverse and forward drive positions, the second of said steps of said first cam engages said face surface of said first ring to drive said clutch sleeve into engagement with said forward gear in step transition movement, said second inclined surface of said first cam engages said face surface of said first ring to further drive said clutch sleeve into engagement with said forward gear;

said first inclined surface of said second cam engages said face surface of said second ring to drive said clutch sleeve out of engagement with said forward gear, the first of said steps of said second cam engages said face surface of said second ring to further drive said clutch sleeve out of engagement with said forward gear in step transition movement, said land of said second cam faces said face surface of said second ring as said shifter moves through a neutral position between said forward and reverse drive positions, the second of said steps of said second cam engages said face surface of said second ring to drive said clutch sleeve into engagement with said reverse gear in step transition movement, said second inclined surface of said second cam engages said face surface of said second ring to further drive said clutch sleeve into engagement with said reverse gear.

16. A marine drive shift mechanism comprising:

a main axial shaft;

a reverse gear freely rotatable about said main shaft, said reverse gear having a clutch face on one side;

a forward gear freely rotatable about said main shaft, said forward gear having a clutch face on one side, with said clutch faces facing each other;

a drive gear meshed with said reverse and forward gears for driving said reverse and forward gears in respectively opposite directions of rotation;

a clutch sleeve mounted on said main shaft between said reverse and forward gears, said clutch sleeve having a clutch face at each end, each clutch face selectively engageable with one of said clutch faces of said reverse and forward gears;

a shifter for selectively moving said clutch sleeve axially along said main shaft to a reverse or forward drive position to engage one of said sleeve clutch faces with one of said reverse or forward gear clutch faces:

wherein each end of the clutch sleeve has an annular groove in which a coil spring resides, each annular groove being defined in part by a clutch sleeve surface having an inward cam surface portion and an outward cam surface portion which slopes more abruptly towards the main axial shaft than the inward cam surface portion and a neutral centering notch located between the outward cam surface portion and the inward cam surface portion to provide a neutral positioning location for the respective coil spring.

* * * * *